United States Patent
Niedersuess et al.

(10) Patent No.: US 10,287,074 B2
(45) Date of Patent: May 14, 2019

(54) COLLATION SHRINK FILMS

(71) Applicant: Borealis AG, Vienna (AT)

(72) Inventors: Peter Niedersuess, Riedmark (AT); Minna Aarnio-Winterhof, Altenberg (AT); Paulo Cavacas, Aldeia dos Chaos (PT)

(73) Assignee: Borealis AG, Vienna (AT)

( * ) Notice: Subject to any disclaimer, the term of this patent is extended or adjusted under 35 U.S.C. 154(b) by 729 days.

(21) Appl. No.: 14/395,093

(22) PCT Filed: Apr. 17, 2013

(86) PCT No.: PCT/EP2013/058021
§ 371 (c)(1),
(2) Date: Oct. 17, 2014

(87) PCT Pub. No.: WO2013/156533
PCT Pub. Date: Oct. 24, 2013

(65) Prior Publication Data
US 2015/0068943 A1    Mar. 12, 2015

(30) Foreign Application Priority Data
Apr. 18, 2012 (EP) .................. 12164653

(51) Int. Cl.
*B65D 71/08* (2006.01)
*B65B 21/24* (2006.01)
(Continued)

(52) U.S. Cl.
CPC .............. *B65D 71/08* (2013.01); *B65B 11/00* (2013.01); *B65B 21/245* (2013.01); *B65B 53/02* (2013.01);
(Continued)

(58) Field of Classification Search
CPC ......... B65D 71/08; B65B 11/00; B65B 53/02; C08J 5/18
(Continued)

(56) References Cited

U.S. PATENT DOCUMENTS 3,712,020 A * 1/1973 Norr ...................... B65B 11/52
53/127
5,015,521 A    5/1991 Fujii et al.
(Continued)

FOREIGN PATENT DOCUMENTS

CN    101563225 A    10/2009
CN    101633415 A    1/2010
(Continued)

*Primary Examiner* — Gloria R Weeks
(74) *Attorney, Agent, or Firm* — Eversheds Sutherland (US) LLP

(57) ABSTRACT

A process for collation shrink wrapping an object that may include a number of individual product containers, preferably substantially identical product containers. The process may include the steps of (i) obtaining a collation shrink film that may include a multimodal linear low density polyethylene (LLDPE), the film being a stretched film that is uniaxially oriented in the machine direction (MD) in a draw ratio of at least 1:3, (ii) wrapping the object in the film, and (iii) heating the object wrapped in the film in order to collation shrink the film around the object.

15 Claims, 1 Drawing Sheet

(51) Int. Cl.
    *B65B 53/06*     (2006.01)
    *B65B 11/00*     (2006.01)
    *C08J 5/18*     (2006.01)
    *B65B 53/02*     (2006.01)
    *C08L 23/08*     (2006.01)

(52) U.S. Cl.
    CPC ................ B65B 53/06 (2013.01); C08J 5/18 (2013.01); *C08J 2323/06* (2013.01); *C08L 23/0815* (2013.01)

(58) Field of Classification Search
    USPC .......................................................... 53/398
    See application file for complete search history.

(56) References Cited

U.S. PATENT DOCUMENTS

| | | | |
|---|---|---|---|
| 5,091,228 A | 2/1992 | Fujii et al. | |
| 5,344,715 A * | 9/1994 | Negi | B32B 27/30 428/520 |
| 5,691,043 A * | 11/1997 | Keller | B29C 55/023 428/212 |
| 6,113,996 A * | 9/2000 | Amon | B29C 55/023 428/34.9 |
| 6,303,233 B1 * | 10/2001 | Amon | B32B 27/32 428/34.9 |
| 6,322,883 B1 * | 11/2001 | Williams | B29C 55/023 428/308.4 |
| 6,391,411 B1 * | 5/2002 | Duckwall, Jr. | B32B 27/32 264/176.1 |
| 6,534,189 B1 * | 3/2003 | Burns | B29C 55/023 428/447 |
| 6,777,046 B1 * | 8/2004 | Tatarka | B29C 55/023 264/464 |
| 6,815,023 B1 * | 11/2004 | Tatarka | B29C 55/023 264/464 |
| 6,821,612 B1 * | 11/2004 | Melik | C08G 63/06 264/176.1 |
| 7,235,607 B2 * | 6/2007 | Ohlsson | B65B 53/00 428/335 |
| 7,951,873 B2 * | 5/2011 | Best | B32B 27/32 428/35.7 |
| 8,129,006 B2 * | 3/2012 | Ginossatis | B32B 27/08 141/10 |
| 2001/0052304 A1 | 12/2001 | Compton et al. | |
| 2004/0053022 A1 | 3/2004 | Ohlsson | |
| 2004/0173492 A1 | 9/2004 | Kane et al. | |
| 2005/0200046 A1 | 9/2005 | Breese | |
| 2007/0215506 A1 | 9/2007 | Hartness | |
| 2008/0190802 A1 * | 8/2008 | Chiu | B65B 53/02 206/497 |
| 2009/0269566 A1 * | 10/2009 | Eichbauer | B32B 27/32 428/220 |
| 2010/0009156 A1 * | 1/2010 | Daviknes | B32B 27/308 428/220 |
| 2010/0275554 A1 | 11/2010 | Tokunaga et al. | |
| 2010/0304062 A1 * | 12/2010 | Daviknes | B32B 27/32 428/35.2 |
| 2011/0028665 A1 | 2/2011 | Eriksson et al. | |
| 2011/0099949 A1 | 5/2011 | Hartness et al. | |
| 2013/0056382 A1 * | 3/2013 | Singh | B32B 27/32 206/524.2 |
| 2014/0141228 A1 * | 5/2014 | Fuchs | C08L 23/0815 428/220 |
| 2014/0248480 A1 * | 9/2014 | Vinck | B32B 7/02 428/218 |
| 2015/0076022 A1 * | 3/2015 | Niedersuess | B65B 11/58 206/432 |

FOREIGN PATENT DOCUMENTS

| | | |
|---|---|---|
| EP | 0 299 750 A2 | 1/1989 |
| EP | 0 380 353 A2 | 8/1990 |
| EP | 0 442 111 A2 | 8/1991 |
| EP | 1 268 280 B1 | 5/2004 |
| EP | 2 067 799 A1 | 6/2009 |
| WO | 99/00251 A1 | 1/1999 |

* cited by examiner

COLLATION SHRINK FILMS

This invention relates to collation shrink film, in particular collation shrink film comprising a multimodal linear low density polyethylene that has been uniaxially stretched in the machine direction. The invention also provides a process a process for collation shrink wrapping an object using this film and the use of the film in collation shrink wrapping.

BACKGROUND OF THE INVENTION

Collation shrink films are films that are wrapped around an object to be packaged and shrunk to keep the units within the object together. The most common use of these films is in the packaging of multiple containers, such as bottles or cans which might contain food, beverages and so on. The collation shrink film is wrapped around a number of the containers, perhaps a 6-pack of drinks or 24 pack of food cans held in a cardboard base and shrunk around the containers. The skilled person is familiar with this rapidly expanding film area.

The wrapping process typically involves a shrink oven or shrink tunnel in which the film and object covered by the film is briefly heated to cause the collation shrink wrapping to occur. The plastic film then collapses around the multiple containers and holds the units in place.

Films which are used as collation shrink films obviously need to possess certain properties to make them commercially interesting. Some of the main characteristics that are required for film applications in this market segment are good shrinkage. The films must possess excellent strength after shrinkage, often referred to as load retention resistance. This property requires that films are stiff.

Films must resist puncture and must not be sticky. The consumer does not want the packaged product to stick to the film. The collation shrink films are cut during the wrapping process so the ability to be cut is important.

Sealing properties are also important. During the wrapping process, the two sides of the film are passed around the object being wrapped and are contacted, typically underneath the product being wrapped. These two film edges must be sealed and the seal strength needs to be high. The whole packaged ensemble is often carried simply by grabbing hold of the packaging film. If the seal strength is weak, the film can fail during this operation. The seal strength must ideally be strong enough to hold the weight of the object packaged. Where the object is a 24 pack of tins, for example, the weight can be significant.

Finally, the brand owner of the goods being packaged ideally wants his products to be clearly visible through the packaging. Optical properties such as low haze and high gloss that result in a brilliant print appearance are important.

Low Density Polyethylene (LDPE) currently dominates the collation films market segment with its good shrink behaviour, especially in transverse direction (TD). It is known however, that multimodal LLDPE exhibits significant benefits over LDPE when blended with other linear low density polyethylene and high density polyethylene components. This mixture offers the highest performance on all key shrink parameters for collation shrink films.

Thus, current collation shrink film solutions are polyethylene blown films which are made from LDPE and LLDPE and/or HDPE. The LDPE is necessary to give high shrink rate and the LLDPE/HDPE component gives a combination of stiffness, toughness and bundling force (also known as cold shrink force).

A major consideration in this rapidly expanding market is costs. Film down-gauging, i.e. using thinner films offers an obvious way of saving costs as thinner films means less film per unit packaged. Down gauged films can only be used however when the other properties of the film as discussed above are maintained. The mechanical properties in particular need to be maintained.

The present invention targets new collation shrink films that can provide these core properties but preferably down gauged. Today there are polyethylene based blown films for collation shrink applications in use with a thickness of approximately 38-45 µm. The present inventors sought films having a thickness (before shrinkage) of less than 38 microns. Ideally, the present inventors sought to down gauge the films to approximately 28 to 32 µm.

One possible route to down gauged films might be to add high density polyethylene (HDPE). The high stiffness of HDPE gives the shrunk film the necessary bundling force, but it makes it necessary to use a higher temperature in the shrink tunnel to effect shrinkage. Moreover, the mechanical strength of the film is poor and the film breaks under stress (e.g. when the bundle is lifted or moved). This solution is not therefore favoured.

Surprisingly, the inventors have found that the use of uniaxially oriented multimodal LLDPE films offers a possible solution to the problem here. When using a monoaxial stretched film of multimodal based LLDPE it is possible to achieve a thin film providing a high mechanical strength and high bundling force and at the same time a very high shrink rate/shrink force at significantly lower temperature compared to non oriented blown film.

It is a key feature of this invention that the temperature required to effect shrinkage is much lower than is conventionally used in a collation film shrink tunnel. Lower temperatures mean lower costs and the product being packaged is not exposed to as high temperatures. This minimises the risk of product degradation.

SUMMARY OF INVENTION

Viewed from one aspect the invention provides a collation shrink film comprising a multimodal linear low density polyethylene (LLDPE), said film being a stretched film which is uniaxially oriented in the machine direction (MD) in a draw ratio of at least 1:3 and which shrinks by at least 50% in the machine direction when exposed to a temperature of 170° C. or less and preferably has a thickness of 50 microns or less.

Viewed from another aspect the invention provides a process for collation shrink wrapping an object which comprises a plurality of individual product containers, preferably substantially identical product containers, comprising:

(i) obtaining a collation shrink film comprising a multimodal linear low density polyethylene (LLDPE), said film being a stretched film which is uniaxially oriented in the machine direction (MD) in a draw ratio of at least 1:3;

(ii) wrapping said object in said film;

(iii) heating said object wrapped in the film in order to collation shrink said film around said object.

As the film is generally provided on a spool, the film is preferably cut before step (ii), i.e. the film is cut from the spool and then wrapped around the object.

Viewed from another aspect the invention provides a process for collation shrink wrapping an object which comprises a plurality of individual product containers, preferably substantially identical product containers, comprising:

(i) obtaining, on a spool, a collation shrink film comprising a multimodal linear low density polyethylene (LLDPE), said film being a stretched film which is uniaxially oriented in the machine direction (MD) in a draw ratio of at least 1:3;

(ii) dispensing film from said spool and cutting the film into an appropriate length to wrap around said object;

(iii) wrapping said object in said film;

(iv) heating said object wrapped in the film in order to collation shrink said film around said object.

Viewed from another aspect the invention provides an object which comprises a plurality of individual product containers collation shrink wrapped by a collation shrink film comprising a multimodal linear low density polyethylene (LLDPE), said film being a stretched film which is uniaxially oriented in the machine direction (MD) in a draw ratio of at least 1:3.

Viewed from another aspect the invention provides the use of a collation shrink film comprising a multimodal linear low density polyethylene (LLDPE), said film being a stretched film which is uniaxially oriented in the machine direction (MD) in a draw ratio of at least 1:3 to collation shrink wrap an object comprising a plurality of individual product containers.

Definitions

The term LLDPE means linear low density polyethylene herein.

The term when exposed to a temperature of 170° C. or less refers to the temperature of the environment around the film such as the temperature of the oven in which the film is placed or the temperature of an oil bath in which the film is placed. It will be appreciated that if the film is present in an oven for a short period of time, the film itself may not heat to the oven temperature. For ease of measurement however, when exposed to a temperature of 170° C. or less refers to that oven temperature and so on rather than the actual film temperature.

The term "an object which comprises a plurality of individual product containers" means that the object being wrapped is itself formed from a plurality of preferably identical containers such as cans, tins, bottles, jars, plastic liquid dispensers (e.g. shower gel, shampoo, and soap containers) and so on. The number of such containers making up the object might vary, e.g. from 4 to 64 containers. The skilled person will be familiar with objects that can be wrapped such as a 6-pack of beverages, 24 pack of food cans and so on.

The product here is not a product formed from a large number of small identical units such as rice, sweets or pasta but is based on a series of containers which contain a desired product.

Often the multiple containers might be carried on a tray, such as a cardboard tray. In that case, the tray forms part of the object being wrapped.

The containers will typically be arranged in a regular pattern such as a square or rectangle. Containers can have any cross-section such as circular (like bottles and cans), oval, square, rectangular or irregular. The smallest cross-section of any container is preferably at least 2 cm. The maximum cross-section is preferably 30 cm. Containers will not typically be stacked before wrapping. There will preferably be a single layer therefore of containers to be wrapped.

The films of the invention are uniaxially oriented in the machine direction. They are not stretched in the transverse direction. The films of the invention are not therefore biaxially oriented.

DETAILED DESCRIPTION OF INVENTION

The collation shrink film of the invention must comprise at least a multimodal LLDPE. It will be appreciated that in any polyethylene of the invention that ethylene forms the major monomer unit present such as at least 80 wt % of the monomer residues present.

It will be preferred if the multimodal LLDPE forms the most abundant polymer present within the film as a whole, i.e. it has the largest weight percentage. Ideally, at least 50 wt % of the collation shrink film is formed from a multimodal LLDPE.

The LLDPE of use in this invention is multimodal. The term "multimodal" means multimodal with respect to molecular weight distribution and includes also therefore bimodal polymers.

Usually, a LLDPE composition, comprising at least two polyethylene fractions, which have been produced under different polymerisation conditions resulting in different (weight average) molecular weights and molecular weight distributions for the fractions, is referred to as "multimodal". The prefix "multi" relates to the number of different polymer fractions present in the polymer. Thus, for example, the term multimodal polymer includes so called "bimodal" polymers consisting of two fractions. The form of the molecular weight distribution curve, i.e. the appearance of the graph of the polymer weight fraction as a function of its molecular weight, of a multimodal polymer, e.g. LLDPE, will show two or more maxima or at least be distinctly broadened in comparison with the curves for the individual fractions.

Ideally, the molecular weight distribution curve for multimodal polymers of the invention will show two distinction maxima.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In any multimodal LLDPE, there is by definition a lower molecular weight component (LMW) and a higher molecular weight component (HMW). The LMW component has a lower molecular weight than the higher molecular weight component. This difference is preferably at least 5000. Preferably, in a multimodal LLDPE of use in this invention at least one of the LMW and HMW components is a copolymer of ethylene. Further preferably, at least the HMW component is an ethylene copolymer. Further preferably, also the lower molecular weight (LMW) component may be an ethylene copolymer. Alternatively, if one of the components is a homopolymer, then LMW is the preferably the homopolymer.

Alternatively the multimodal LLDPE may comprise other polymer components, e.g. up to 10% by weight of a well known polyethylene prepolymer (obtainable from a prepolymerisation step as well known in the art). In case of such prepolymer, the prepolymer component is comprised in one of LMW and HMW components, preferably LMW component, as defined above.

The term "ethylene copolymer" is used in this context to encompass polymers comprising repeat units deriving from ethylene and at least one other $C_{4-12}$ alpha olefin monomer. Preferred copolymers are binary and comprise a single comonomer or are terpolymers and comprise two or three comonomers. In any copolymeric HMW component, preferably at least 0.25 mol-%, preferably at least 0.5 mol-%, e.g. at least 1-mol %, such as up to 10 mol-%, of repeat units derive from the comonomer. Ethylene preferably forms the majority of the HMW component.

The preferred multimodal LLDPE composition is defined further below.

Accordingly, the multimodal LLDPE composition may have a density of no more than 940 kg/m$^3$, e.g. 905-940 kg/m$^3$. The density is preferably 915 kg/m$^3$ or more. Ideally, the multimodal LLDPE preferably has a density of 915 to 935 kg/m$^3$.

The melt flow rate, $MFR_2$ of the multimodal LLDPE is preferably in the range 0.01 to 20 g/10 min, e.g. 0.05 to 10 g/10 min, preferably 0.1 to 6.0 g/10 min. The $MFR_2$ is highly preferably in the range of 0.10 to 5 g/10 min.

The $MFR_{21}$ of the multimodal LLDPE may be in the range 5 to 500, preferably 10 to 200 g/10 min.

The Mw of the multimodal LLDPE, may be in the range 100,000 to 300,000, preferably 150,000 to 270,000. The Mw/Mn of the multimodal LLDPE may be in the range 10 to 30, preferably 10 to 25.

The multimodal LLDPE, may be formed from ethylene along with at least one $C_{4-12}$ alpha-olefin comonomer, e.g. 1-butene, 1-hexene or 1-octene. Preferably, the multimodal LLDPE, is a binary copolymer, i.e. the polymer contains ethylene and one comonomer, or a terpolymer, i.e. the polymer contains ethylene and two or three comonomers. Preferably, the multimodal LLDPE, comprises an ethylene hexene copolymer, ethylene octene copolymer or ethylene butene copolymer. The amount of comonomer present in the multimodal LLDPE, is preferably 0.5 to 12 mol %, e.g. 2 to 10% mole relative to ethylene, especially 4 to 8% mole.

As stated above a multimodal LLDPE comprises at least a LMW component and a HMW component.

The LMW component of LLDPE preferably has a $MFR_2$ of at least 50, preferably 50 to 3000 g/10 min, more preferably at least 100 g/10 min. The molecular weight of the low molecular weight component should preferably range from 20,000 to 50,000, e.g. 25,000 to 40,000.

The density of the lower molecular weight component may range from 930 to 980 kg/m$^3$, e.g. 940 to 970 kg/m$^3$, more preferably 945 to 955 kg/m$^3$ in the case of copolymer and 940 to 975 kg/m$^3$, especially 960 to 972 kg/m$^3$ in the case of homopolymer.

The lower molecular weight component preferably forms from 30 to 70 wt %, e.g. 40 to 60% by weight of the multimodal LLDPE with the higher molecular weight component forming 70 to 30 wt %, e.g. 40 to 60% by weight.

The higher molecular weight component has a lower $MFR_2$ and a lower density than the lower molecular weight component.

The higher molecular weight component has preferably an $MFR_2$ of less than 1 g/10 min, preferably less than 0.5 g/10 min, especially less than 0.2 g/10 min, and a density of less than 915 kg/m$^3$, e.g. less than 910 kg/m$^3$, preferably less than 905 kg/m$^3$. The Mw of the higher molecular weight component may range from 100,000 to 1,000,000, preferably 250,000 to 500,000.

Preparation of Polymer

The multimodal LLDPE can be any conventional, e.g. commercially available, polymer composition. Alternatively, suitable polymer compositions can be produced in a known manner according to or analogously to conventional polymerisation processes described in the literature of polymer chemistry.

Unimodal LLDPE, is preferably prepared using a single stage polymerisation, e.g. slurry or gas phase polymerisation, preferably a slurry polymerisation in slurry tank or, more preferably, in loop reactor in a manner well known in the art. As an example, a unimodal LLDPE can be produced e.g. in a single stage loop polymerisation process according to the principles given below for the polymerisation of low molecular weight fraction in a loop reactor of a multistage process, naturally with the exception that the process conditions (e.g. hydrogen and comonomer feed) are adjusted to provide the properties of the final unimodal polymer.

Multimodal (e.g. bimodal) polymers can be made by mechanical blending two or more, separately prepared polymer components or, preferably, by in-situ blending in a multistage polymerisation process during the preparation process of the polymer components. Both mechanical and in-situ blending are well known in the field.

Accordingly, preferred multimodal LLDPEs, are prepared by in-situ blending in a multistage, i.e. two or more stage, polymerization or by the use of two or more different polymerization catalysts, including multi- or dual site catalysts, in a one stage polymerization.

Preferably the multimodal LLDPE, is produced in at least two-stage polymerization using the same catalyst, e.g. a single site or Ziegler-Natta catalyst. Thus, for example two slurry reactors or two gas phase reactors, or any combinations thereof, in any order can be employed. Preferably however, the multimodal polymer, e.g. LLDPE, is made using a slurry polymerization in a loop reactor followed by a gas phase polymerization in a gas phase reactor.

A loop reactor—gas phase reactor system is marketed by Borealis as a BORSTAR reactor system. Any multimodal polymer, e.g. LLDPE, present is thus preferably formed in a two stage process comprising a first slurry loop polymerisation followed by gas phase polymerisation.

The conditions used in such a process are well known. For slurry reactors, the reaction temperature will generally be in the range 60 to 110° C. (e.g. 85-110° C.), the reactor pressure will generally be in the range 5 to 80 bar (e.g. 50-65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerization may if desired be effected under supercritical conditions. Slurry polymerisation may also be carried out in bulk where the reaction medium is formed from the monomer being polymerised.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

Preferably, the lower molecular weight polymer fraction is produced in a continuously operating loop reactor where ethylene is polymerised in the presence of a polymerization catalyst as stated above and a chain transfer agent such as hydrogen. The diluent is typically an inert aliphatic hydrocarbon, preferably isobutane or propane.

The higher molecular weight component can then be formed in a gas phase reactor using the same catalyst.

Where the higher molecular weight component is made second in a multistage polymerisation it is not possible to measure its properties directly. However, the skilled man is able to determine the density, $MFR_2$ etc of the higher molecular weight component using Kim McAuley's equations. Thus, both density and $MFR_2$ can be found using K. K. McAuley and J. F. McGregor: On-line Inference of Polymer Properties in an Industrial Polyethylene Reactor, AIChE Journal, June 1991, Vol. 37, No, 6, pages 825-835.

The density is calculated from McAuley's equation 37, where final density and density after the first reactor is known.

$MFR_2$ is calculated from McAuley's equation 25, where final $MFR_2$ and $MFR_2$ after the first reactor is calculated. The use of these equations to calculate polymer properties in multimodal polymers is common place.

The multimodal LLDPE may be made using any conventional catalyst, such as a chromium, single site catalyst, including metallocenes and non-metallocenes as well known in the field, or Ziegler-Natta catalysts as is also known in the art. The preferred choice is any conventional Ziegler Natta catalyst. Such an LLDPE is called a znLLDPE herein.

In case of znLLDPE the polyethylene polymer composition is manufactured using Ziegler-Natta catalysis. Preferred Ziegler-Natta catalysts comprise a transition metal component and an activator. The transition metal component comprises a metal of Group 4 or 5 of the Periodic System (IUPAC) as an active metal. In addition, it may contain other metals or elements, like elements of Groups 2, 13 and 17. Preferably, the transition metal component is a solid. More preferably, it has been supported on a support material, such as inorganic oxide carrier or magnesium halide. Examples of such catalysts are given, among others in WO 95/35323, WO 01/55230, WO 2004/000933, EP 810235 and WO 99/51646.

In a very preferable embodiment of the invention the polyethylene composition is produced using a Ziegler Natta catalyst disclosed in WO 2004/000933 or EP-A-0688794.

Conventional cocatalysts, supports/carriers, electron donors etc can be used.

Films

The films of the invention can be multilayer films or monolayer films. In its simplest embodiment, the present invention covers a collation shrink film which is a monolayer film comprising a multimodal LLDPE as herein described as the major component. The monolayer film may simply consist essentially of the multimodal LLDPE. Any film might also contain a mixture of multimodal LLDPE's of the invention.

The term consist essentially of is used in this context to indicate that the only polyolefin present is the multimodal LLDPE. The film may however contain standard polymer additives as described below, possibly added via a masterbatch. The levels of these additives are low, typically below 3 wt %.

The monolayer film can be formed by extrusion of the necessary polymer to form the film. Monolayer films might also be produced by coextrusion of the same material into separate layers. Such layers become essentially indistinguishable after extrusion. It will be appreciated that the films of the invention might comprise a blend of two or more different multimodal LLDPE's.

It is preferred however if the multimodal LLDPE is blended with other components in order to form the films of the invention. Ideally, therefore the films of the invention are monolayer films in which the multimodal LLDPE of the invention forms the major component or are multilayer films which comprise multimodal LLDPE as the major component. This might be present in one layer of a multilayer film or in more than one layer of a multilayer film.

In addition to the multimodal LLDPE, the films of the invention might contain LDPE (low density polyethylene) or a unimodal LLDPE especially one made using metallocene type catalysis. The films might also contain a very low density polyethylene, i.e. an ethylene with C3-12 alpha olefin copolymer having a density of 900 kg/m$^3$ or less. These polymers are preferably metallocene produced. Preferred very low density polyethylenes have a density of 850 to 900 kg/m$^3$, such as 860 to 895 kg/m$^3$. They may have an $MFR_2$ of 0.4 to 3 g/10 min.

It is preferred if the films of the invention are free of any high density polyethylene, i.e. a polyethylene homopolymer or copolymer with a C3-12 alpha olefin having a density of more than 940 kg/m$^3$.

It is also preferred if the films of the invention are free of any ethylene (meth)acrylate polymers.

In a further preferred embodiment the films of the invention are free of LDPE. It is believed that the presence of LDPE in the films of the invention might impart poor stretch and poor mechanical properties to the film. Moreover, LDPE does not assist the shrinkage properties of the film.

Films of the invention may also be free of the very low density polyethylene defined above.

It is especially preferred therefore if the films of the invention are free of HDPE, LDPE and acrylates. Thus, the films preferably consist essentially of the multimodal LLDPE, an optional unimodal LLDPE and an optional very low density polyethylene component.

Unimodal LLDPE's are LLDPEs which have a single peak in the GPC curve and which are therefore produced in a single polymerisation step. Unimodal LLDPEs are preferably metallocene produced, i.e. they are synthesised using metallocene catalysis. This gives characteristic features to the polymer such as narrow Mw/Mn, even comonomer distribution (observable under TREF) and so on. These polymers will be called unimodal mLLDPE's herein.

As used herein, the unimodal LLDPE polymer is an ethylene copolymer having a density of 940 kg/m$^3$ or less. Preferred unimodal LLDPE's may have a density of 905-940 kg/m$^3$, more preferably 910 to 937 kg/m$^3$, e.g. 935 kg/m$^3$ or below. In one preferable embodiment even densities of 925 kg/m$^3$ or below are highly feasible.

The unimodal LLDPE is formed from ethylene along with at least one C4-12 alpha-olefin comonomer, e.g. 1-butene, 1-hexene or 1-octene. Preferably, the unimodal LLDPE is a binary copolymer, i.e. the polymer contains ethylene and one comonomer, or a terpolymer, i.e. the polymer contains ethylene and two or three, preferably two, comonomers. Preferably, the unimodal LLDPE comprises an ethylene hexene copolymer, ethylene octene copolymer, ethylene butene copolymer or a terpolymer of ethylene with 1-butene and 1-hexene comonomers. The amount of comonomer present in the unimodal LLDPE is preferably 0.5 to 12 mol %, e.g. 2 to 10% mole, especially 4 to 8% mole.

The $MFR_2$ of unimodal LLDPE's is preferably in the 0.01 or more, preferably 0.1 to 20 g/10 min, e.g. 0.2 to 10, preferably 0.5 to 6.0, e.g. 0.7 to 4.0 g/10 min.

The unimodal LLDPE has preferably a weight average molecular weight (Mw) of 100,000-250,000, e.g. 110,000-160,000.

The unimodal LLDPE polymers preferably posses a narrow molecular weight distribution. The Mw/Mn value is preferably 2 to 8, e.g. 2.2 to 4.

Unimodal LLDPEs are well know commercial products.

The invention especially covers therefore a collation shrink film comprising multimodal LLDPE, and a unimodal LLDPE.

It is preferred if films of the invention are multilayered. Multilayer films are preferably formed from at least three layers, such as 3 layers, 5 layers or 6 layers. Films preferably comprise therefore at least layers A, B and C.

It is preferred if two or more of the layers in the films of the invention comprise a multimodal LLDPE as hereinbefore defined. It is especially preferred if at least layer (A) and layer (B) of the film comprise a multimodal LLDPE.

The (A) layer of the film is preferably an external layer. It is preferably involved in sealing of the film (to itself). Said layer (A) preferably comprises at least a multimodal LLDPE, in particular a multimodal Ziegler Natta LLDPE. Ideally, this layer is a blend of that multimodal LLDPE with a unimodal LLDPE in particular a mLLDPE. These single site LLDPEs impart excellent sealing behaviour to the films. The (A) layer may also be a blend of the multimodal LLDPE component and a very low density polyethylene as herein described.

Said layer (B) preferably comprises, e.g. consist of a multimodal LLDPE.

Said layer (C) preferably comprises the same structure as layer (A). Preferred films of the invention are therefore ABA type films.

Film Layers

The term "consisting essentially of" used below in relation to film layer materials is meant to exclude only the presence of other polyolefin components, preferably other polymers. Thus said term does not exclude the presence of additives, e.g. conventional film additives, i.e. each layer independently may contain conventional film additives such as antioxidants, UV stabilisers, acid scavengers, nucleating agents, anti-blocking agents, slip agents etc as well as polymer processing agent (PPA) and so on.

Films of the invention preferably comprise layers (A) and (B) below, especially layers (A), (B) and (C) below.

Layer (A)

Accordingly, in a first preferable embodiment (i) of the invention, said layer (A) comprises a mixture of a multimodal LLDPE and unimodal LLDPE or very low density polyethylene. In this embodiment (i) a layer (A) preferably comprises 40-75 wt % of multimodal LLDPE, more preferably 40 to 70% of multimodal LLDPE. Layer (A) of the embodiment (i) preferably comprises 25-60 wt % unimodal LLDPE or very low density polyethylene, more preferably 30-60 wt %. The use of a 50/50 wt % split of multimodal and unimodal LLDPE or very low density polyethylene is especially preferred here. Layer (A) preferably consists essentially of these components.

Layer (B)

Layer (B) preferably comprises at least 50 wt %, preferably at least 60 wt %, more preferably at least 70 wt % of a multimodal LLDPE. In some embodiments even about 80 wt % or more of multimodal LLDPE is preferred. Multimodal LLDPE is preferably a multimodal znLLDPE. Preferably said layer (B) consists of a multimodal LLDPE polymer(s). It may therefore comprise a blend of two multimodal LLDPE's or a single multimodal LLDPE.

Layer (C)

Said layer (C) may have a polymer composition as described in relation to layer (A) above. Preferably layers (A) and (C) are identical in a ABA type film structure.

The film thickness distribution (%) of a ABC layer film is preferably 20 to 40%/20-60%/20-40% of the total film thickness (100%).

In a further preferred embodiment, the films of the invention comprise at least five/six layers, preferably in the following order:
(i) a first outer layer (A),
(ii) a second outer layer (B),
(iii) a first inner layer (C),
(iv) a second inner layer (C),
(v) a third outer layer (B) and
(vi) a fourth outer layer (A)

This film is preferably formed from two identical ABC type films and it can be argued that the centre C layers merge to become one (and hence a 5 layer construction). For an ABCCBA film structure the thickness of the layers may conform to 7.5-27.5%/15-35%/5-25%/15-35%/7.5-27.5%, wherein the total film thickness is 100% and the amount of core layer is the sum of two layers (C).

In an ABCCBA structure it is preferred if the (C) layers are not the same as the (A) layers. In particular, the (C) layers can comprise a very low density polyethylene as hereinbefore defined.

Each A, B or C layer may independent have a composition as hereinbefore defined. Ideally, the ABCCBA film is formed from two identical ABC films laminated together via their (C) layers.

Film Preparation

Collation shrink films are produced by extrusion through an annular die with a pressure difference applied to blow the extruded cylinder into a film and achieve the desired orientation within the film, i.e. to build a stress into the cooled film. Heat treatment results in stress relaxation and, as a result, shrinkage. Most of the shrinkage occurs while the film is at its hottest (generally ca. 120-130° C.) during the heat treatment; however the film continues to shrink as it cools. These are referred to as the hot shrink force and the cold shrink force respectively and for a polymer to function adequately as the base material for a collation shrink film it should meet the different requirements (in terms of melt strength, cold strength and other mechanical properties) of the hot shrink, cold shrink and post-shrinkage stages.

Collation shrink films of the invention have a particularly beneficial cold shrink force. The high cold shrink forces provide excellent holding properties, i.e. they serve to stabilize the shrink-wrapped product. Moreover, the shrunk film has mechanical properties which are improved relative to conventional shrink films, especially at very low temperatures. As a result the shrink films of the invention are especially suited for use in packaging products which will be exposed to low temperatures during transportation or storage.

Thus the films of the invention exhibit the following advantageous properties:

high cold shrink force, leading to better holding by the shrunk film of objects packaged by it;

improved mechanical properties for the shrink film, allowing more demanding (e.g. sharp edged) products to be shrink wrapped and/or allowing thinner films to be used (and hence allowing the amount of polymer wrapping to be reduced); and a glossy or transparent optics.

For film formation using polymer mixtures the different polymer components (e.g. within layers (A), (B) and optional (C)) are typically intimately mixed prior to extrusion and blowing of the film as is well known in the art. It is especially preferred to thoroughly blend the components, for example using a twin screw extruder, preferably a counter-rotating extruder prior to extrusion and film blowing.

The films of the invention are uniaxially oriented. That means that are stretched in a single direction, the machine direction.

The preparation of a uniaxially oriented multilayer film of the invention comprises at least the steps of forming a layered film structure and stretching the obtained multilayer film in a draw ratio of at least 1:3.

Typically the compositions providing the layers of the film will be blown i.e. (co)extruded at a temperature in the range 160° C. to 240° C., and cooled by blowing gas (generally air) at a temperature of 10 to 50° C. to provide a frost line height of 1 or 2 to 8 times the diameter of the die. The blow up ratio should generally be in the range 1.2 to 6, preferably 1.5 to 4.

The obtained film is subjected to a subsequent stretching step, wherein the film is stretched in the machine direction. Stretching may be carried out by any conventional technique using any conventional stretching devices which are well known to those skilled in the art.

Preferably for ABCCBA type film structures, said film can advantageously be prepared first by coextruding compositions forming the layers (B), (C) and (A) through an annular die, blowing by blown extrusion into a tubular film to form a bubble. The formed bubble is then collapsed e.g. in nip rolls to form said film where layers (C) are contacted inside/inside, i.e. ABC/CBA. Alternatively, the coextruded bubble may be collapsed and split into two films. The two films can then be stretched separately in a winding machine (2×ABC films).

Stretching is preferably carried out at a temperature in the range 70-90° C., e.g. about 80° C. Any conventional stretching rate may be used, e.g. 2 to 40%/second.

The film is stretched only in the machine direction to be uniaxial. The effect of stretching in only one direction is to uniaxially orient the film.

The film is stretched at least 3 times, preferably 3 to 10 times, its original length in the machine direction. This is stated herein as a draw ratio of at least 1:3, i.e. "1" represents the original length of the film and "3" denotes that it has been stretched to 3 times that original length. Preferred films of the invention are stretched in a draw ratio of at least 1:4, more preferably between 1:5 and 1:8, e.g. between 1:5 and 1:7. An effect of stretching (or drawing) is that the thickness of the film is similarly reduced. Thus a draw ratio of at least 1:3 preferably also means that the thickness of the film is at least three times less than the original thickness.

Blow extrusion and stretching techniques are well known in the art, e.g. in EP-A-299750.

The film preparation process steps of the invention are known and may be carried out in one film line in a manner known in the art. Such film lines are commercially available.

The films of the invention typically have a starting (or original) thickness of 400 µm or less, preferably 40 to 300 µm, more preferably 50 to 250 µm prior to the stretching step.

After stretching, the final thickness of the uniaxially oriented films, of the invention is typically 50 µm or less, preferably 10 to 50 µm, more preferably 15 to 40 µm, still more preferably 20 to 38 µm, e.g. 25 to 38 µm, especially 28 to 32 µm.

Film Properties

When subjected to heat, such as in the shrink tunnel, it is preferred if the films of the invention contract in the machine direction by between 40 and 85% such as 50 to 80%, such as 60 to 75%. This shrinkage ratio represents the total shrink of the film, i.e. that which occurs during the heating process in the tunnel/oven and the shrinkage which occurs during the cooling process.

It is preferred if the film of the invention shrinks by at least 50% in the machine direction even when exposed to heat of 170° C. or less. It is preferred if the films of the invention shrink by at least 50% in the machine direction at temperatures of between 80 and 160° C., such as 90 to 150° C.

Shrink in the transverse direction can be up to 10%. Ideally transverse direction shrinkage is up to 10%, especially in the temperature range of 90 to 170° C.

The films of the invention preferably have high stiffness before the shrink process. Higher stiffness allows the collation shrink film to be easily handled. Film stiffness before shrinkage may be 700 to 1000 MPa.

The material may have high penetration energy to withstand sharp objects. Puncture resistance values may be of the order of 22 J/mm before shrinkage.

Bundling force or cold shrink force is preferably above 2 N in the machine direction.

The films of the invention preferably have a haze value of less than 20 before shrinkage.

Collation Shrink Process

The collation shrink film of the invention can then be wrapped around an object in a conventional manner. The collation shrink film is typically supplied in a large roll in its stretched form. Film is dispensed from the roll, cut and placed over (i.e. above) the object to be wrapped. The film is obviously cut into appropriate lengths as it is dispensed from the roll.

Generally the object to be collation shrink wrapped will be present on a conveyor belt or other conveying means. The wrapping process is a continuous process so the conveyor will contain a plurality of objects to be wrapped.

As each object moves along the conveyor, the collation shrink film is moved over the top of the object and then wrapped over it, down two opposite sides and underneath it using conventional equipment. The two ends of the film are therefore brought together and contacted underneath the object. These ends form a seal during the later shrink process or can be sealed using sealing bars as described later.

The other two sides of the object remain open but the film used will be wider than the object so that there will be film protruding around the open ends. In the shrink tunnel, this film folds in to wrap those open ends. A hole is still left in the "open ends" as is known.

It is preferred if the two sides of the object (i.e. the sides in addition to the top and bottom of the object) covered by the film are the long sides of the object. Thus in a 3×2 can arrangement, it is the side of 3 cans which is covered and the side with 2 cans which remains open. Obviously, if the object is a square then there is no shorter side and it doesn't matter which side is which.

The wrapped object is then heated in some fashion to enable the collation shrink process and preferably also to seal the collation shrink film to itself underneath the object. Ideally, the wrapped object is passed through a heat tunnel in order to shrink the film around the object. The machine direction of the shrink tunnel is also the MD direction of the film.

Current shrink tunnels typically employ temperatures of 180 to 210° C. This exposes therefore the material being packaged to high temperature albeit for a short period of time. It is perceived however that these high temperatures are required to enable the necessary collation shrinkage properties and to effect a seal of the film underneath the object.

It is a major benefit of the use of the collation shrink films of the invention that commercially relevant levels of machine direction shrinkage can be achieved at much lower temperatures. The temperature to which the collation shrink films of this invention are exposed may be up to 170° C., preferably up to 160° C., such as 80 to 150° C. Ideally the temperature is in the range of 90 to 140° C.

Note of course, that what matters here is the temperature which the film experiences. In order to make sure that the film experiences a particular temperature, it may be that the shrink tunnel has to be a little warmer than that temperature. In terms of the temperatures experience by the film itself, we have observed useful shrink properties when the actual film temperature is 140° C. or less such as 80 to 135° C., especially 90 to 130° C.

For the targeted machine direction oriented films of this invention, the tunnel temperature could be reduced to 130-170° C. for example, in order to make sure that the collation shrink films within the tunnel experience the temperatures mentioned above.

Low shrinkage temperatures, might however lead to poor film sealing. It may therefore be necessary to use sealing bars to effect a seal of the two ends of the collation shrink film of the invention. This may be carried out before the object is exposed to shrink temperatures.

The object may spend up to 1 min in the heated zone in order to ensure that the collation shrink wrapping occurs, such as 20 to 30 seconds.

In general, this collation shrink wrapping process is known to the person skilled in the art. The present invention concerns the nature of the film used to carry out the shrink wrapping.

Applications

The collation shrink films of the invention are preferably used in the wrapping of household, food, healthcare or beverage products, in particular products that are packaged in containers such as bottles, cans, tubs and the like. Wherever a product is shipped in numerous essentially identical containers, the use of collation shrink film is useful to prevent damage to the products and keep the product secure during transport. The most common application is therefore in the beverage transportation market.

It will be appreciated that the collation shrink film might also be used to wrap industrial products such as chemicals and the like.

The invention will now be described with reference to the following non-limiting examples and figures.

DETERMINATION METHODS

Figure 1:
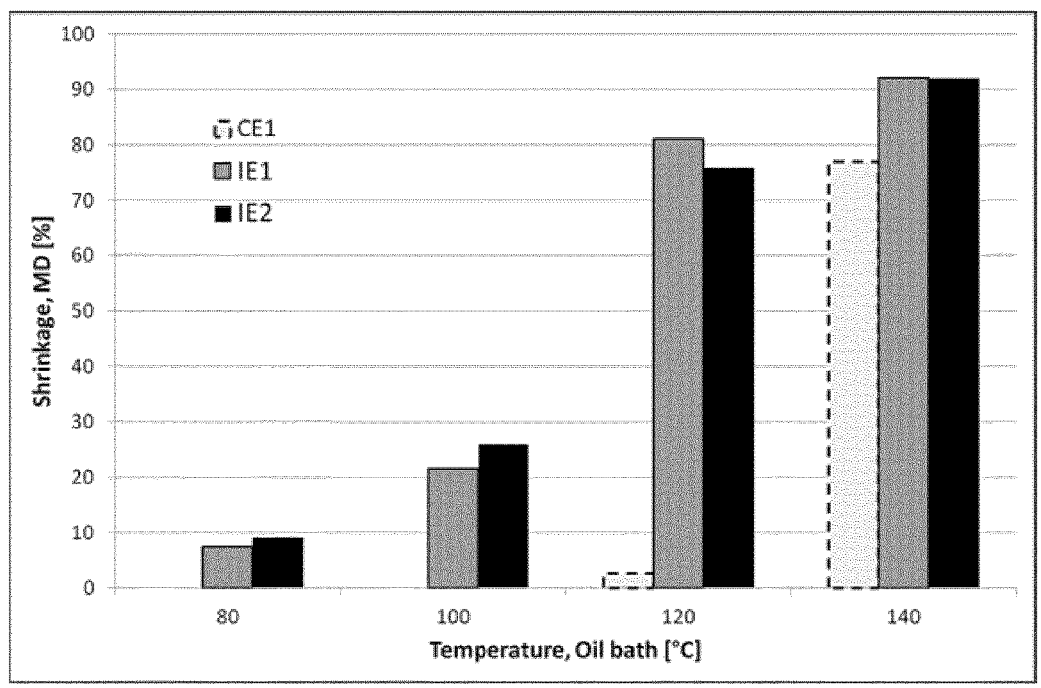
FIG. 1 shows the relative machine direction shrinkage properties of the films of the invention relative to a non oriented reference film at various different temperatures.
Figure 2:
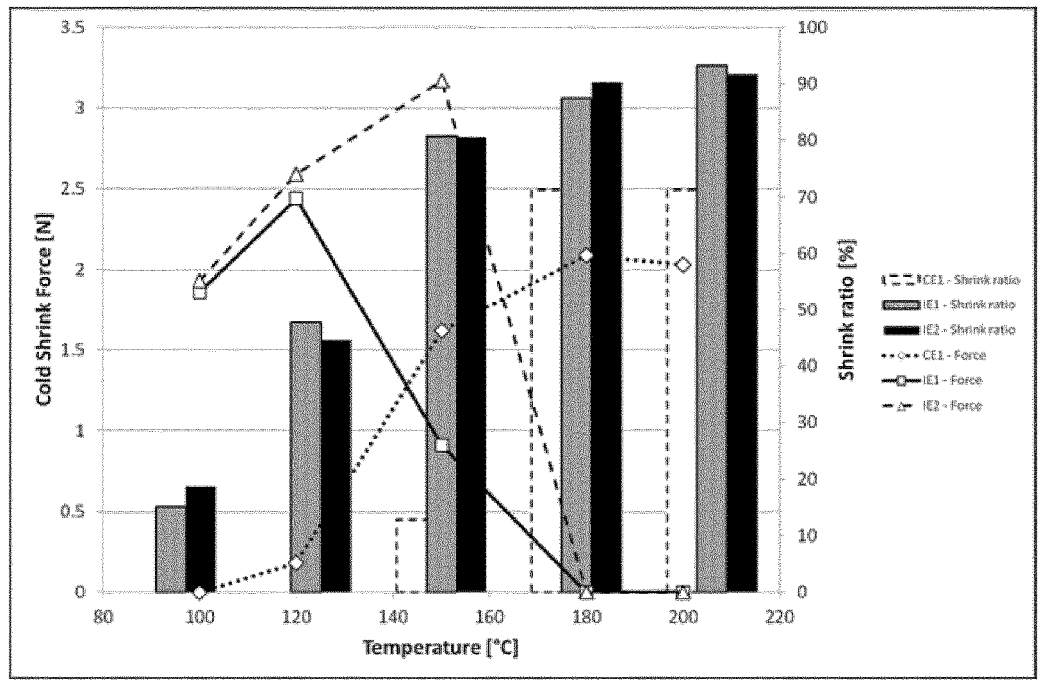
FIG. 2 shows the cold shrink force as a function of shrink rate at different temperatures (100-200° C.).

Density of the materials is measured according to ISO 1183:1987 (E), method D, with isopropanol-water as gradient liquid. The cooling rate of the plaques when crystallising the samples was 15° C./min. Conditioning time was 16 hours.

Melt Flow Rate (MFR) or Melt Index (MI)

The melt flow rate (MFR) is determined according to ISO 1133 and is indicated in g/10 min. The MFR is an indication of the melt viscosity of the polymer. The MFR is determined at 190° C. for PE and at 230° C. for PP. The load under which the melt flow rate is determined is usually indicated as a subscript, for instance $MFR_2$ is measured under 2.16 kg load, $MFR_5$ is measured under 5 kg load or $MFR_{21}$ is measured under 21.6 kg load.

Molecular Weights, Molecular Weight Distribution, Mn, Mw, MWD

The weight average molecular weight Mw and the molecular weight distribution (MWD=Mw/Mn wherein Mn is the number average molecular weight and Mw is the weight average molecular weight) is measured by a method based on ISO 16014-4:2003. A Waters 150CV plus instrument, equipped with refractive index detector and online viscosimeter was used with 3×HT6E styragel columns from Waters (styrene-divinylbenzene) and 1,2,4-trichlorobenzene (TCB, stabilized with 250 mg/L 2,6-Di tert butyl-4-methyl-phenol) as solvent at 140° C. and at a constant flow rate of 1 mL/min. 500 µL of sample solution were injected per analysis. The column set was calibrated using universal calibration (according to ISO 16014-2:2003) with 10 narrow MWD polystyrene (PS) standards in the range of 1.05 kg/mol to 11 600 kg/mol. Mark Houwink constants were used for polystyrene and polyethylene (K: $19 \times 10^{-3}$ dL/g and a: 0.655 for PS, and K: $39 \times 10^{-3}$ dL/g and a: 0.725 for PE). All samples were prepared by dissolving 0.5-3.5 mg of polymer in 4 mL (at 140° C.) of stabilized TCB (same as mobile phase) and keeping for 2 hours at 140° C. and for another 2 hours at 160° C. with occasional shaking prior sampling in into the GPC instrument.

Comonomer Content (% wt and % mol) was determined by using $^{13}C$-NMR. The $^{13}C$-NMR spectra were recorded on Bruker 400 MHz spectrometer at 130° C. from samples dissolved in 1,2,4-trichlorobenzene/benzene-$d_6$ (90/10 w/w). Conversion between % wt and % mol can be carried out by calculation.

Haze is measured according to ASTM D 1003.

Cold shrink forces have been measured according to standard ISO 14616:1997 in Machine (MD) direction in the following way. Specimens of 15 mm width and 115 mm length are cut out from the film sample MD. The samples are tightly mounted into the jaws of the load cell in such a way that the distance between the jaws is 100 mm and the actual force is zero. The samples are then exposed to hot air at given temperature. After closing the chamber the shrinkage temperature is reached at the maximum force. This is recorded and it represents the hot shrink force. The hot air chamber is removed after force has reduced 15-30% from maximum while continuing to record the force. The maximum force is again recorded and this second maximum represents the cold shrink force.

Example 1

Two 25 micron uniaxially stretched films were produced from two different multimodal LLDPEs. Grade 1 was a multimodal Ziegler Natta linear low density polyethylene having a density of 923 kg/m³ and an $MFR_2$ of 0.4 g/10 min. Grade 2 is a multimodal Ziegler Natta linear low density polyethylene having a density of 931 kg/m³ and an $MFR_2$ of 0.2 g/10 min.

The inventive films were made in a first step on a blown film line at a thickness of 150 µm, BUR 1:3 and die gap 1,4 mm. The film structure is a monolayer film consisting of Grade 1 or Grade 2 (IE1 or IE2 respectively).

The film is then stretched on an MDO unit with a stretch ratio of 6 at a temperature of 110° C. This is done by unwinding the film and feeding it into the MDO unit. First the heating rolls get the film to up to a temperature of 110° C., then the film is stretched in between the stretching rolls due to 6 times higher speed of the second stretching roll over the first one. In an annealing and cooling step the orientation in the film is fixed.

This film was compared to a 30 micron non oriented monolayer film formed from a blend of multimodal znLLDPE (45 wt % of density 931 kg/m³ and $MFR_2$ 0.2 g/10 min)/HDPE (40 wt % of density 958 kg/m³ and $MFR_2$ of 0.7 g/10 min) and/LDPE (15 wt % of density 920 kg/m³ and $MFR_2$ of 0.3 g/10 min).

Shrinkage in Oil:

Comparative determination of shrinkage was performed in oil according to internal Borealis method. 50 mm×50 mm samples are placed in oil (Polydimethylsiloxan) at given temperature for 10 seconds. After this the samples are removed, and conditioned at room temperature for 1 hour. Finally the shrinkage, i.e. change in dimension is measured. Results are presented in table 1. Shrinkage values are calculated as:

$$Shrinkage = (Lo-Lm)*100/Lo$$

wherein Lo is the original length (i.e. 50 mm), and Lm is the length measured after thermal exposure.

If the measured value increases (e.g. in the TD direction), then shrinkage is negative.

TABLE 1

| Shrink Temperature (in Oil) | Parameter | Unit | Non oriented film | Film IE1. | Film IE2 |
| --- | --- | --- | --- | --- | --- |
| 80° C. | Length Md After | mm | 50 | 46.3 | 45.5 |
| 80° C. | Length Td After | mm | 50 | 50.2 | 50 |
| 80° C. | Shrinkage Md | % | 0 | 7.4 | 9 |
| 80° C. | Shrinkage Td | % | 0 | −0.4 | 0 |
| 100° C. | Length Md After | mm | 50 | 39.2 | 37 |
| 100° C. | Length Td After | mm | 50 | 51.6 | 51.2 |
| 100° C. | Shrinkage Md | % | 0 | 21.6 | 26 |
| 100° C. | Shrinkage Td | % | 0 | −3.2 | −2.4 |
| 120° C. | Length Md After | mm | 48.7 | 9.5 | 12.1 |
| 120° C. | Length Td After | mm | 50 | 53.5 | 52.9 |
| 120° C. | Shrinkage Md | % | 2.6 | 81 | 75.8 |
| 120° C. | Shrinkage Td | % | 0 | −7 | −5.8 |
| 140° C. | Length Md After | mm | 11.5 | 4 | 4 |
| 140° C. | Length Td After | mm | 46.6 | 44.2 | 44 |
| 140° C. | Shrinkage Md | % | 77 | 92 | 92 |
| 140° C. | Shrinkage Td | % | 6.8 | 11.6 | 12 |

Example 2

Mechanical data from the films are presented in Table 2 along with further shrink ratio data. Table 2 shows shrink data occurring the shrink force tests. Due to thermic conductivity, the shrinkage is different than at the same temperature in oil.

TABLE 2

| Shrink Temp. | Parameter (MD always) | Unit | Non oriented film | Film IE1 | Film IE2 |
| --- | --- | --- | --- | --- | --- |
| 100° C. | Cold Shrink Force | N | nd | 1.86 | 1.93 |
| 100° C. | Shrink Ratio | % | nd | 15.11 | 18.73 |
| 120° C. | Cold Shrink Force | N | 0.18 | 2.44 | 2.59 |
| 120° C. | Shrink Ratio | % | nd | 47.78 | 44.63 |
| 150° C. | Cold Shrink Force | N | 1.62 | 0.91 | 3.17 |
| 150° C. | Shrink Ratio | % | 12.87 | 80.7 | 80.6 |
| 180° C. | Cold Shrink Force | N | 2.09 | nd | nd |
| 180° C. | Shrink Ratio | % | 71.2 | 87.43 | 90.3 |
| 200° C. | Cold Shrink Force | N | 2.03 | nd | nd |
| 200° C. | Shrink Ratio | % | 71.23 | 93.17 | 91.67 |

Nd not determined

Shrink ratios % length that the film is shorter after heat application.

We claim:

1. A process for collation shrink wrapping an object which comprises a plurality of individual product containers, preferably substantially identical product containers, comprising:
   (i) obtaining a collation shrink film comprising a multimodal linear low density polyethylene (LLDPE), said film being a stretched film which is uniaxially oriented in the machine direction (MD) in a draw ratio of at least 1:3;
   (ii) wrapping said object in said film; and
   (iii) heating said object wrapped in the film in order to collation shrink said film around said object.

2. A process as claimed in claim 1 comprising:
   (i) obtaining a collation shrink film comprising a multimodal linear low density polyethylene (LLDPE), said film being a stretched film which is uniaxially oriented in the machine direction (MD) in a draw ratio of at least 1:3 on a spool;
   (ii) dispensing film from said spool and cutting the film into an appropriate length to wrap around said object;
   (iii) wrapping said object in said film; and
   (iv) heating said object wrapped in the film in order to collation shrink said film around said object.

3. A process as claimed in claim 1, whereas said collation shrink film has a thickness of 15 to 40 microns.

4. A process as claimed in claim 1, wherein the object wrapped in the film is heated to a temperature of 170° C. or less.

5. A process as claimed in claim 1, wherein said multimodal polyethylene is formed from a lower molecular weight homopolymer and a higher molecular weight copolymer or a lower molecular weight copolymer and a different higher molecular weight copolymer.

6. A process as claimed in claim 1, wherein said collation shrink film is free of HDPE and LDPE.

7. A process as claimed in claim 1, wherein said collation shrink film comprises a unimodal LLDPE.

8. A process as claimed in claim 1, wherein the collation shrink film is a monolayer film.

9. A process as claimed in claim 1, wherein said collation shrink film comprises a multilayer film having at least two layers A and B.

10. A process as claimed in claim 9 wherein layer (A) comprising a unimodal LLDPE and a multimodal LLDPE.

11. A process as claimed in claim 9, wherein layer (B) comprises a multimodal LLDPE.

12. A process as claimed in claim 1, wherein said collation shrink film is free of LDPE.

13. A process as claimed in claim 1, wherein said collation shrink film comprises a multilayer film having at least three layers ABC.

14. An object which comprises a plurality of individual product containers collation shrink wrapped by a collation shrink film comprising a multimodal linear low density polyethylene (LLDPE), said film being a stretched film which is uniaxially oriented in the machine direction (MD) in a draw ratio of at least 1:3.

15. A collation shrink film comprising a multimodal linear low density polyethylene (LLDPE), said film being a stretched film which is uniaxially oriented in the machine direction (MD) in a draw ratio of at least 1:3 and which shrinks by at least 50% in the machine direction at a temperature of 170° C. or less and preferably has a thickness of 50 microns or less.

* * * * *